(12) United States Patent
Lee et al.

(10) Patent No.: US 7,526,156 B2
(45) Date of Patent: Apr. 28, 2009

(54) OPTICAL FIBER FOR OUT-COUPLING OPTICAL SIGNAL AND APPARATUS FOR DETECTING OPTICAL SIGNAL USING THE SAME OPTICAL FIBER

(75) Inventors: Seihyoung Lee, Gwangju (KR); Shin Young Yoon, Gwangju (KR); Hyun Seo Kang, Gwangju (KR)

(73) Assignee: Electronics and Telecommunications Research Institute (KR)

( * ) Notice: Subject to any disclaimer, the term of this patent is extended or adjusted under 35 U.S.C. 154(b) by 0 days.

(21) Appl. No.: 11/758,051

(22) Filed: Jun. 5, 2007

(65) Prior Publication Data

US 2008/0089644 A1    Apr. 17, 2008

(30) Foreign Application Priority Data

Aug. 18, 2006   (KR)   ................ 10-2006-0078255

(51) Int. Cl.
  *G02B 6/26* (2006.01)
(52) U.S. Cl. .............. 385/31; 385/15; 385/37
(58) Field of Classification Search ............ 385/15, 385/31, 37
  See application file for complete search history.

(56) References Cited

U.S. PATENT DOCUMENTS

| | | | |
|---|---|---|---|
| 5,042,897 A | 8/1991 | Meltz et al. | |
| 5,647,039 A | 7/1997 | Judkins et al. | |
| 6,407,852 B1 * | 6/2002 | Lange et al. | 359/333 |
| 6,522,810 B2 | 2/2003 | Takushima et al. | |
| 6,801,550 B1 | 10/2004 | Snell et al. | |
| 6,850,665 B2 | 2/2005 | Grubsky et al. | |
| 7,138,621 B2 * | 11/2006 | Wang | 250/227.14 |
| 2002/0094159 A1 | 7/2002 | Goldberg et al. | |

FOREIGN PATENT DOCUMENTS

KR   1020030088567    11/2003
KR   1020070031179 A    3/2007

OTHER PUBLICATIONS

All references cited in the Foreign Office Action and not previously submitted are listed above.

\* cited by examiner

*Primary Examiner*—Jennifer Doan
(74) *Attorney, Agent, or Firm*—Cantor Colburn LLP

(57) ABSTRACT

Provided are an optical fiber, which has an out-coupling characteristic of high coupling efficiency and is advantageous in terms of size reduction, and an optical signal detecting apparatus, which has a high coupling rate and high degree of integration, using the optical fiber. The optical signal out-coupling optical fiber includes: a core in which a tilted Bragg grating or a long period optical fiber grating is formed; and a cladding that surrounds the core and in which at least one V-groove that totally reflects optical signals is formed, wherein optical signals are out-coupled by using the grating and the V-groove. The optical signal detecting apparatus includes: an optical signal out-coupling optical fiber; and an optical signal receiving device monitoring or detecting optical signals emitted from the optical fiber. The optical signal out-coupling optical fiber has an in-line structure which does not require a complicated external structure, and thus can be made more compact and emit optical signals highly efficiently, and the optical signal detecting apparatus using the optical fiber can monitor or detect optical signals with a high degree of integration and high optical coupling efficiency.

16 Claims, 4 Drawing Sheets

OPTICAL FIBER FOR OUT-COUPLING OPTICAL SIGNAL AND APPARATUS FOR DETECTING OPTICAL SIGNAL USING THE SAME OPTICAL FIBER

CROSS-REFERENCE TO RELATED PATENT APPLICATION

This application claims the benefit of Korean Patent Application No. 10-2006-0078255, filed on Aug. 18, 2006 in the Korean Intellectual Property Office, the disclosure of which is incorporated herein in its entirety by reference.

BACKGROUND OF THE INVENTION

1. Field of the Invention

The present invention relates to an optical communication device, and more particularly, to an optical fiber that can monitor or detect optical signals and an optical signal detecting apparatus using the optical fiber.

2. Description of the Related Art

In general, in order to monitor or detect optical signals propagating through an optical fiber core, the optical path of a core mode needs to be changed, and it can be changed by generating an optical fiber grating in the core. For example, when a tilted Bragg grating is formed in the core, a forward-propagating core mode can be changed to a backward-propagating cladding mode, and when a long period fiber grating is formed in the core, a forward-propagating core mode can be changed to a forward-propagating cladding mode.

Hereinafter, a conventional method of detecting optical signals and changing an optical path will be described briefly with reference to FIGS. 1 and 2.

FIG. 1 is a cross-sectional view illustrating an optical device in which optical paths are changed and detected using two optical fibers including tilted Bragg gratings, which is disclosed in U.S. Pat. No. 6,850,665. Hereinafter, the structure and the function of the optical device will be described briefly.

Referring to FIG. 1, the optical device for changing path and detecting optical signals is formed of two optical fibers 10 and 20 coupled together, wherein the two optical fibers 10 and 20 include tilted Bragg gratings 14 and 24 which are tilted in cores 12 and 22. Optical signals are detected as follows. An optical signal propagates through a core of an upper optical fiber 10 to the right and is coupled to a cladding mode by the tilted Bragg grating 14 and then propagates through the cladding 16 to the left. Then the optical signal is optically coupled by an optical fiber coupling portion 25 to propagate through a cladding 26 of a lower optical fiber 20 and then is optically coupled with a core mode by the tilted Bragg grating 24 and propagates to the right through the core 22. Although not illustrated in FIG. 1, the optical signal propagating through the core 22 is monitored or detected by an optical signal receiving device such as a monitor photodiode (mPD).

In the above described structure, it is necessary to have the sufficient optical coupling between two optical waveguides to monitor or detect optical signals delivered in the core mode, and in order to achieve sufficient optical coupling, the optical fiber coupling portions 25 should be up to several tens of cm. Accordingly, the size of the optical signal detecting apparatus becomes large and inappropriate for high integration.

Also, an optical device having an in-line structure which does not require an additional optical waveguide has been suggested. The optical device uses only one optical fiber in which a tilted Bragg grating is formed and thus can be manufactured more easily than the optical device illustrated in FIG. 1, and the overall size of the optical signal detecting apparatus can also be made more compact. However, such a structure can emit only a small portion of optical signals propagated through the core and the efficiency thereof is too small. Thus, the structure can only be used to monitor optical signals for checking only whether optical signals exist or not. That is, the optical device is not appropriate for use in an optical signal detecting apparatus which directly detects optical signals. The optical device is described in more detail in U.S. Pat. No. 5,042,897.

FIG. 2 is a cross-sectional view illustrating an optical receiver module using a conventional out-coupler, which is disclosed in Korean Patent Publication Gazette No. 0461154. The structure and function of the optical receiver module will be described briefly hereinafter.

Referring to FIG. 2, the optical receiver module includes an optical fiber 30, an optical fiber supporting unit 40 supporting the optical fiber 30 and including an out-coupler 42, and an optical receiver chip 50 receiving optical signals. The optical fiber 30 includes a core 32 and a cladding 34, and a portion of the core 32 is exposed so as to be coupled to the out-coupler 42. A grating 44 is formed in the out-coupler 42 and couples optical signals output from the core 32 to the optical receiver chip 50. The optical receiver chip 50 includes a light receiving portion 52 for focusing optical signals inside the optical receiver chip 50 and is supported on an optical receiver chip supporting substrate 60. An opening 62 is formed in the optical receiver portion 60 so that optical signals can be focused onto the receiving portion 52.

The optical receiver module has a structure in which optical signals are emitted through the exposed optical fiber core 32 and the out-coupler 42 in which the grating 44 are formed and the output optical signals are received by the optical receiver chip 50. The above described optical receiver module can achieve a coupling efficiency of 50% or greater. However, since an additional out-coupler is used on the outside, the size of the device becomes large and thus is inappropriate for high integration as the optical device illustrated in FIG. 1.

SUMMARY OF THE INVENTION

The present invention provides an optical fiber which has out-coupling characteristics of high coupling efficiency and is advantageous for reducing the size of a device, and an optical signal detecting apparatus using the optical fiber for realizing the high out-coupling efficiency and high integration degree.

According to an aspect of the present invention, there is provided an optical signal out-coupling optical fiber comprising: a core in which a tilted Bragg grating or a long period optical fiber grating is formed; and a cladding that surrounds the core and in which at least one V-groove that totally reflects optical signals is formed, wherein optical signals are out-coupled using the grating and the V-groove.

The tilted Bragg grating or the long period grating may couple a forward core mode to a backward cladding mode or to a forward cladding mode. The V-groove may be formed by polishing or etching the cladding, and a V-groove may be formed each in an upper portion and in a lower portion around the core.

A tilted Bragg grating may be formed in the core, the V-groove may be formed in a direction in which optical signals are incident on the region of the tilted Bragg grating, and when a long period optical fiber grating is formed, the V-groove is formed in a direction in which optical signals are emitted in the region of the long period optical fiber grating. At least two V-grooves may be formed, and an epoxy may be formed in at least one of the V-grooves, and optical signals may be refracted at the V-groove in which the epoxy is formed and emitted to the outside. The epoxy may be formed so as to function as a lens.

Two V-grooves may be formed, and the V-grooves may be inclined at a predetermined angle with respect to the propagation direction of the cladding mode, and an epoxy may be formed in the V-groove that is near to the grating of the two V-grooves such that optical signals are refracted at the V-groove, and are totally reflected at the V-groove, in which the epoxy is not formed, thus to be focused in the same direction.

According to another aspect of the present invention, there is provided an optical signal detecting apparatus comprising: the optical signal out-coupling optical fiber; and an optical signal receiving device monitoring or detecting optical signals emitted from the optical fiber.

The tilted Bragg grating or the long period optical fiber grating may couple a forward-propagating core mode to a backward-propagating cladding mode or a forward-propagating cladding mode, and optical signals of the backward- or forward-propagating cladding mode are reflected at the V-groove so as to be incident on the optical signal receiving device.

At least two V-grooves may be formed, and an epoxy may be formed in at least one of the V-grooves, and optical signals may be refracted at the V-groove in which the epoxy is formed and emitted to the outside. The epoxy may be formed so as to function as a lens focusing the emitted optical signals to the optical signal receiving device.

The optical signal out-coupling optical fiber according to the present invention includes a tilted Bragg grating or a long period optical fiber grating formed in a core and V-grooves in a cladding, in order to out-couple optical signals, that is, to emit optical signals outside of the optical fiber, thereby realizing an optical signal detecting apparatus that has a high efficiency optical coupling characteristic and is highly integrated, having a small size.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
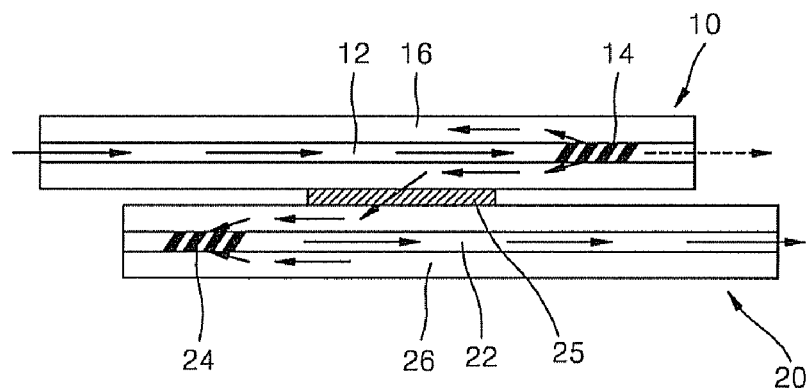
FIG. 1 is a cross-sectional view illustrating a conventional optical device in which optical signals are changed and detected using two optical fibers including tilted Bragg gratings.
Figure 2:
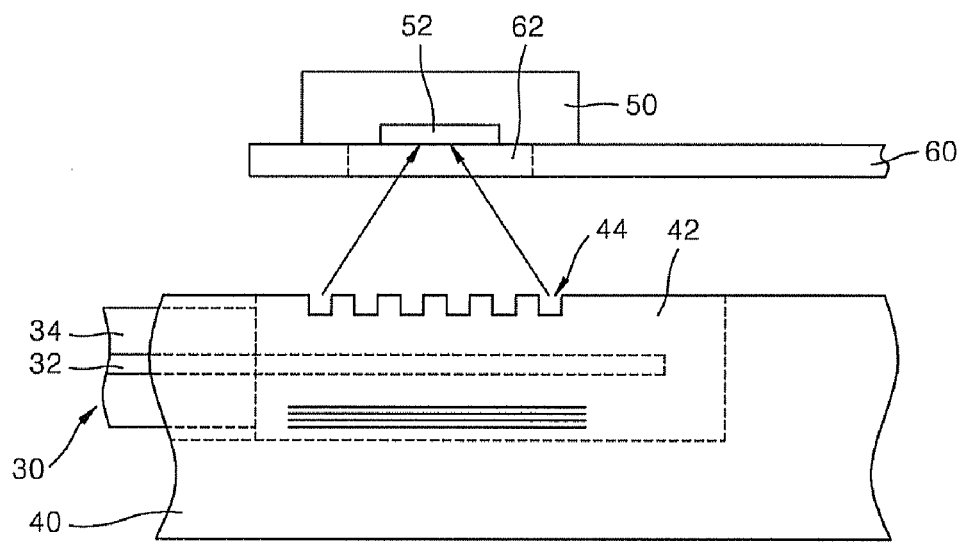
FIG. 2 is a cross-sectional view illustrating an optical receiver module using a conventional out-coupler.

The present invention will now be described more fully with reference to the accompanying drawings, in which exemplary embodiments of the invention are shown. It will also be understood that when a layer is referred to as being "on" another layer or substrate, it can be directly on the other layer or substrate, or intervening layers may also be present. In the drawings, the thicknesses of layers and regions are exaggerated for clarity. The terms used herein are for illustrative purposes only and should not be construed to limit the meaning or the scope of the present invention as described in the claims.

Figure 3:
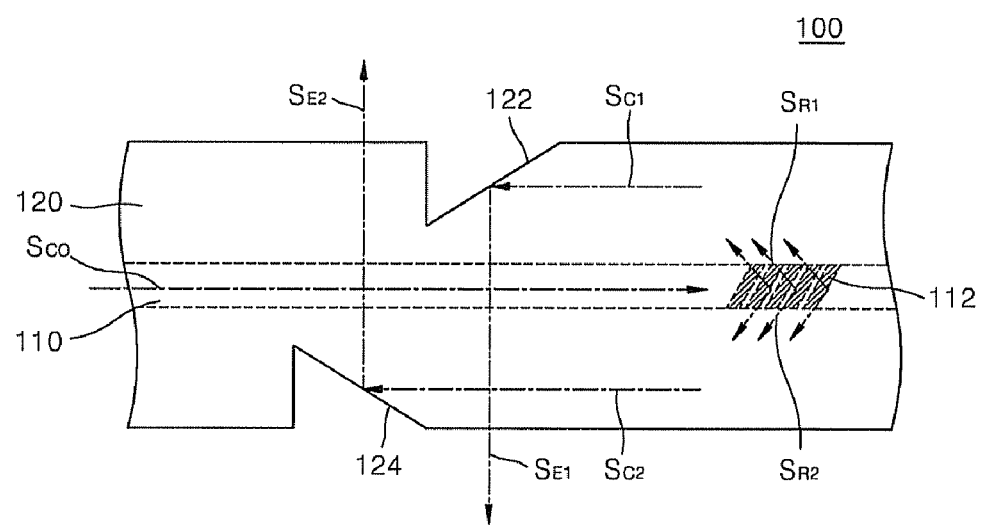
FIG. 3 is a cross-sectional view illustrating an optical signal out-coupling optical fiber (hereinafter 'out-coupling optical fiber') using a tilted Bragg grating according to an embodiment of the present invention.

FIG. 3 is a cross-sectional view illustrating an optical fiber 100 out-coupling optical signals using a tilted Bragg grating according to an embodiment of the present invention.

Referring to FIG. 3, the optical fiber 100 according to the current embodiment includes a core 110 in which a tilted Bragg grating is formed and a cladding 120 that surrounds the core 110 and in which V-grooves 122 and 124 are formed.

The Bragg grating 112 is inclined at a predetermined angle with respect to a normal line of the propagation direction of optical signals in order to optically couple the core mode $S_{CO}$ with the cladding mode $S_{C1}$ as illustrated in FIG. 3.

The V-grooves 122 and 124 formed in the outer cladding 120 can be made by polishing or etching, and the depth of the V-grooves 122 and 124 may be formed differently according to each application of an optical signal detecting apparatus including the optical fiber 100. That is, if the optical signal detecting apparatus is for monitoring optical signals, the depth of the V-grooves is several µm, and if the optical signal detecting apparatus is for detecting optical signals, the depth of the V-grooves may be formed up to several tens of µm. The V-grooves 122 and 124 emit optical signals to the outside by reflecting optical signals of the cladding mode through the cross-section of the V-grooves 122 and 124, thus the deeper the V-grooves are formed, the more the optical signals can be emitted to the outside. For example, the V-grooves may be formed to a depth of about 55 µm or less, to 125 µm or less in a width direction of the optical fiber, and to 110 µm or less in a length direction of the optical fiber.

The current embodiment shows two V-grooves 122 and 124, but one V-groove or three or more V-grooves may also be formed. By having more V-grooves, more optical signals can be emitted. However, the number of V-grooves may be determined in consideration of a focusing performance of a light receiving device that monitors or detects the emitted optical signals. Also, such V-grooves may be formed in any position of the optical fiber cladding as long as the coating of the optical fiber is stripped. Accordingly, the location of the V-grooves may be determined in consideration of packaging with an external optical signal receiving device.

Meanwhile, the V-grooves 122 and 124 are formed in a direction in which optical signals are incident on the Bragg grating 112 around the Bragg grating 112. That is, referring to FIG. 3, when a core mode optical signal $S_{CO}$ propagating to the right along the core 110 is directed in a forward direction, cladding mode optical signals $S_{C1}$ and $S_{C2}$, which are optically coupled by the Bragg grating 112 and propagated to the left through the cladding 120, are in a backward direction. Thus in order to reflect the cladding mode optical signals $S_{C1}$ and $S_{C2}$, the V-grooves 122 and 124 should be formed on the left side of the Bragg grating 112.

Since a cross-section of each of the V-grooves 122 and 124 reflects cladding mode optical signals, one cross-section of each of the V-grooves 122 and 124 should be inclined at a predetermined angle with respect to the propagation direction of the cladding mode optical signals. For example, one cross-section of a V-groove may be inclined at 45° or less with respect to the propagation direction of optical signals so that optical signals can be reflected by the total internal reflection effect. However, the inclination angle is not limited thereto but may be determined to have total internal reflection and maximum reflectivity according to the material of the cladding 120. Also, the reflectivity at the cladding-air boundary needs to be considered. A cross-section on the opposite side of the V-grooves 122 and 124 is not related to reflection of optical signals and thus may be formed at any desired angle.

Optical signals are emitted through the optical fiber 100 according to the current embodiment in the following manner. Referring to FIG. 3, first, an optical signal propagates along the core 110 to the right as a core mode optical signal $S_{CO}$, and becomes optical signals $S_{R1}$ and $S_{R2}$ that are coupled with a cladding mode by the tilted Bragg grating 112. Then the optical signal propagates along the cladding 120 to the left as cladding mode optical signals $S_{C1}$ and $S_{C2}$. The cladding mode optical signals $S_{C1}$ and $S_{C2}$ are reflected at a cross-section of V-grooves 122 and 124 and redirected so as to be emitted to the outer side of the optical fiber 100. The emitted cladding mode optical signals $S_{E1}$ and $S_{E2}$ may be emitted perpendicularly to the cladding-air boundary so that the reflectivity is minimum. Thus, the reflection angle at the cross-section of the V-grooves 122 and 124 should be considered.

The optical signal out-coupling optical fiber (hereinafter 'out-coupling optical fiber') according to the current embodiment does not require another external device and out-couples optical signals in an in-line structure, and thus is advantageous for reducing the size of the device. In addition, the amount of optical signal emission can be increased through the V-grooves, which increases optical coupling efficiency with the external optical signal receiving device, thereby realizing an optical signal detecting apparatus having high optical coupling efficiency. Also, since V-grooves can be formed at desired positions, it is advantageous for passive packaging with an optical signal receiving device.

Figure 4:
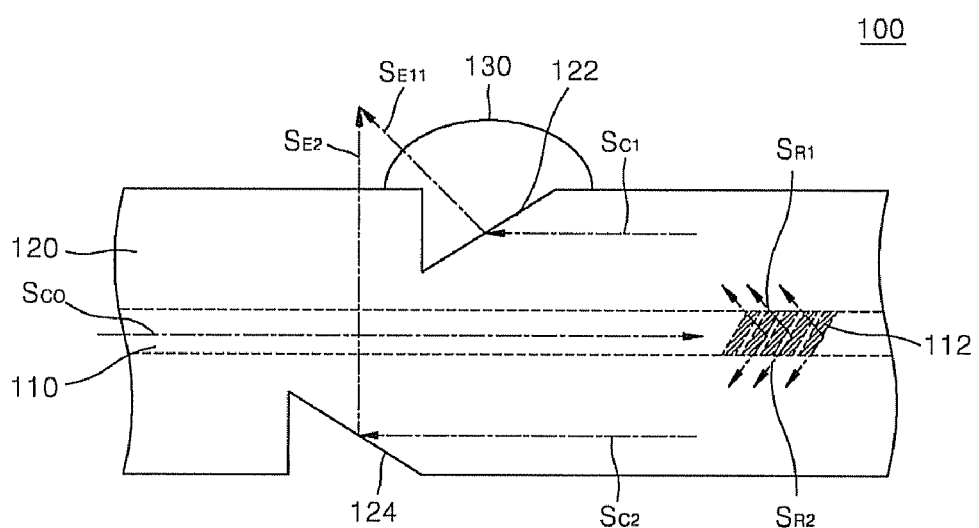
FIG. 4 is a cross-sectional view illustrating an out-coupling optical fiber according to another embodiment of the present invention, which is a modified example of the device illustrated in FIG. 3, including an epoxy in a V-groove.

FIG. 4 is a cross-sectional view illustrating an optical fiber out-coupling optical signals according to another embodiment of the present invention, which is a modified example of the device illustrated in FIG. 3, wherein an epoxy is applied to the V-grooves;

The structure of the optical fiber illustrated in FIG. 4 is basically the same as the optical fiber illustrated in FIG. 3. However, referring to FIG. 4, a first V-groove 122, which is near to a Bragg grating 112, includes an epoxy 130. When the epoxy 130 is formed in the first V-groove 122, a cladding mode optical signal $S_{C1}$ is not reflected at the cross-section of the first V-groove 122 but refracted and emitted to the outside. That is, when the epoxy 130 having a greater refractive index than a cladding 120 is formed in the first V-groove 122, optical signals are not reflected at the cross-section of the V-groove but refracted according to Snell's Law.

Thus the cladding mode optical signal emitted through the first V-groove 122 using the epoxy 130 can be directed in the same direction as the cladding mode optical signal emitted through the second V-groove 124. Accordingly, as the two emitted optical signals are focused on one point, the focusing efficiency is increased, and the optical coupling efficiency in the optical signal receiving device can be increased. Also, since the optical signal receiving device needs to be positioned in just one direction, the device can be made more compact.

In the current embodiment, the epoxy 130 is used. However, any transparent material having a greater refractive index than the cladding 120 may also be used. Meanwhile, the epoxy 130 may be formed having a lens form in order to focus light.

Figure 5:
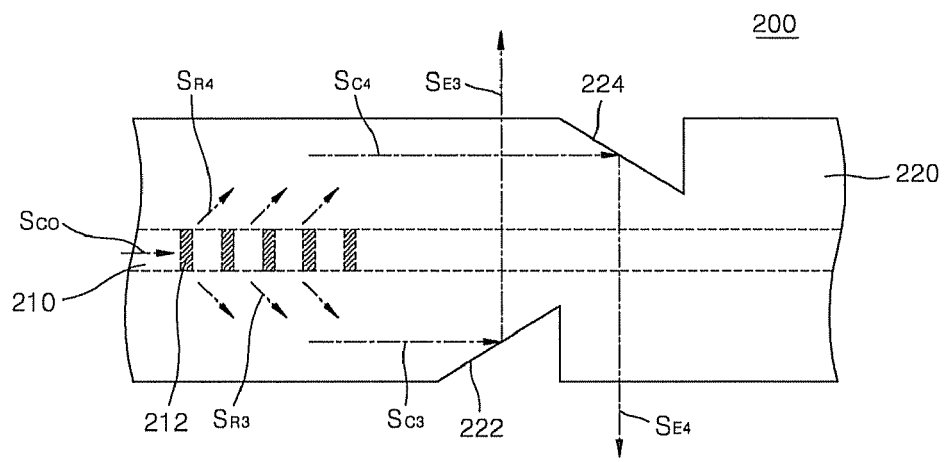
FIG. 5 is a cross-sectional view illustrating an out-coupling optical fiber using a long period optical fiber grating according to another embodiment of the present invention.

FIG. 5 is a cross-sectional view illustrating an out-coupling optical fiber 200 using a long period optical fiber grating according to another embodiment of the present invention.

Referring to FIG. 5, the optical fiber 200 according to the current embodiment includes a core 210 in which a long period optical fiber grating 212 is formed and a cladding 220 that surrounds the core 210 and in which V-grooves 222 and 224 are formed. In the current embodiment, a core mode optical signal $S_{CO}$ is coupled with cladding mode optical signals $S_{C3}$ and $S_{C4}$ by the long period optical fiber grating 212. Accordingly, unlike the embodiment illustrated in FIG. 3, the forward-propagating core mode optical signal $S_{CO}$ is coupled to the forward-propagating cladding mode optical signals $S_{C3}$ and $S_{C4}$ by the long period optical fiber grating 212. Thus since optical signals in a forward direction proceed continuously in a forward direction by the long period optical fiber grating 212, the V-grooves 222 and 224 are formed on the right side of the long period optical fiber grating 212.

Optical signals are emitted through the optical fiber 200 according to the current embodiment in the following manner. First, an optical signal propagates along the core 210 to the right as a core mode optical signal $S_{CO}$, and becomes optical signals $S_{R3}$ and $S_{R4}$ that are coupled with a cladding mode by the long period optical fiber grating 212. Then the optical signal proceeds along the cladding 220 to the right as cladding mode optical signals $S_{C3}$ and $S_{C4}$. The cladding mode optical signals $S_{C3}$ and $S_{C4}$ are reflected at a cross-section of V-grooves 222 and 224 and redirected so as to be emitted to the outer side of the optical fiber 200.

The method of forming the V-grooves 222 and 224, and the structure and number of the V-grooves 222 and 224 are the same as the embodiment illustrated in FIG. 3.

Figure 6:
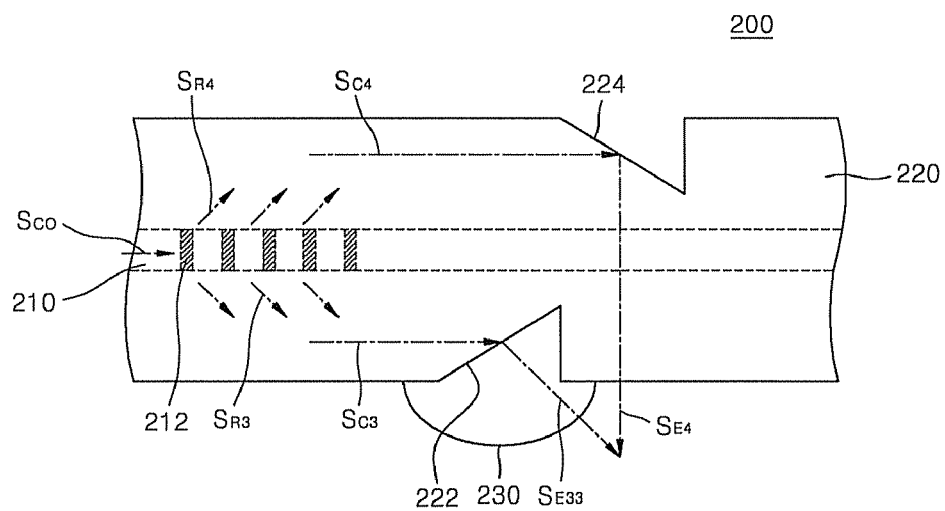
FIG. 6 is a cross-sectional view illustrating an out-coupling optical fiber according to another embodiment of the present invention, which is a modified example of the device illustrated in FIG. 5, including an epoxy in a V-groove.

FIG. 6 is a cross-sectional view illustrating an out-coupling optical fiber 200 according to another embodiment of the present invention, which is a modified example of the device illustrated in FIG. 5, wherein an epoxy is applied to the V-grooves.

The structure of the optical fiber illustrated in FIG. 6 is basically the same as the optical fiber illustrated in FIG. 5. However, referring to FIG. 6, a first V-groove 222, which is near to a long period optical fiber grating 212, includes an epoxy 230. When the epoxy 230 is formed in the first V-groove 222, the emitted cladding mode optical signal $S_{E33}$ through the first V-groove 222 can be directed in the same direction as the cladding mode optical signal $S_{E4}$ emitted through the second V-groove 124. Accordingly, as the two emitted optical signals are focused on one point, the focusing efficiency is increased, and the optical coupling efficiency in the optical signal receiving device can be increased. Also, since the optical signal receiving device needs to be positioned in just in one direction, the device can be made more compact.

Also, in the current embodiment the epoxy 230 is used, but any transparent material having a greater refractive index than the cladding 220 may also be used. Meanwhile, the epoxy 230 may be formed having a lens form in order to focus light.

Figure 7A:
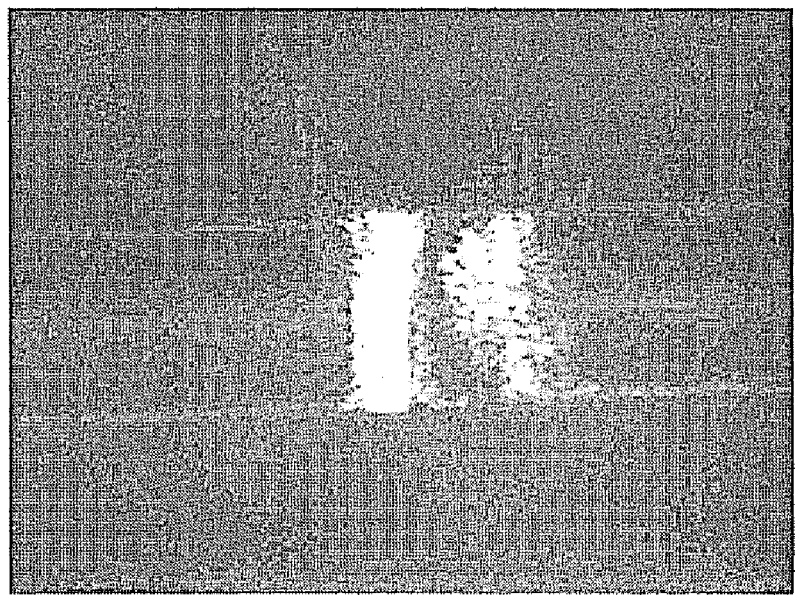
FIGS. 7A and 7B are photographs made by an infrared camera showing that optical signals are emitted in upward and downward directions in the optical fiber illustrated in FIG. 3.
Figure 7B:
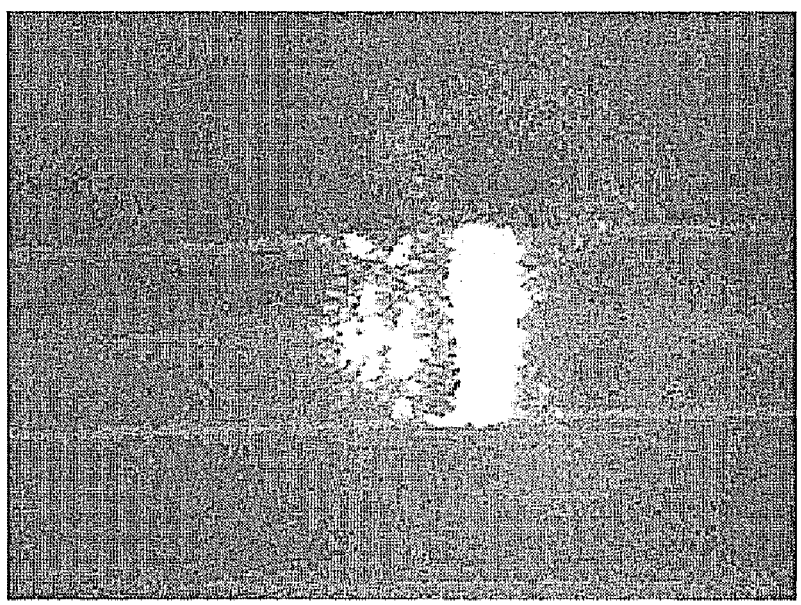

FIGS. 7A and 7B are photographs taken by an infrared camera showing that optical signals are emitted in, respectively, upward and downward directions in the optical fiber illustrated in FIG. 3.

FIG. 7A is a photograph of an optical signal emitted in an upward direction in the optical fiber illustrated in FIG. 3 taken by an infrared camera, wherein the brightest portion denotes the cladding mode optical signal $S_{E2}$ which is reflected and emitted by the V-groove 124 below.

FIG. 7B is a photograph of an optical signal emitted in a downward direction in the optical fiber illustrated in FIG. 3 taken by an infrared camera, wherein the brightest portion denotes the cladding mode optical signal $S_{E1}$ which is reflected and emitted by the V-groove 122 above.

Meanwhile, although not illustrated in the drawings, when an epoxy functioning as a lens, as shown in FIG. 4 or 6, is applied to the V-groove, optical signals can be emitted in a more focused form of a circle or oval.

Since the out-coupling efficiency of optical signals of the out-coupling optical fiber is very high, an optical signal detecting apparatus can be formed by integrating the out-coupling optical fiber and an optical signal receiving device such as a typical monitor photodiode (mPD), thereby an optical signal detecting apparatus having high optical coupling efficiency can be formed. The optical signal receiving device in this case may be an optical signal monitoring device simply monitoring optical signals or an optical signal detecting device detecting optical signals.

The out-coupling optical fiber according to the present invention has an in-line structure which does not require other external optical devices and thus can out-couple optical signals highly efficiently, thereby enabling a highly integrated optical signal detecting apparatus in a compact size.

As described above, the out-coupling optical fiber according to the present invention includes a tilted Bragg grating or a long period optical fiber grating in the core and V-grooves in the cladding, and thus has an in-line structure which does not require a conventional complicated external structure, and thus can be made more compact and emit optical signals highly efficiently.

Also, since the structure of the optical fiber is simple and the V-grooves can be formed at desired positions, the optical fiber can be passively packaged in an optical signal detecting apparatus.

An optical signal detecting apparatus according to the present invention uses the out-coupling optical fiber and thus can monitor or detect optical signals at a high degree of integration and high optical coupling efficiency.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An optical signal out-coupling optical fiber comprising:
   a core in which a tilted Bragg grating or a long period optical fiber grating is formed; and
   a cladding that surrounds the core and comprises at least one V-groove which emits optical signals to an outside by totally reflecting the optical signals, the optical signals being out-coupled using the grating and the V-groove.

2. The optical signal out-coupling optical fiber of claim 1, wherein the tilted Bragg grating or the long period grating couples a forward-propagating core mode to a backward-propagating cladding mode or to a forward-propagating cladding mode, respectively.

3. The optical signal out-coupling optical fiber of claim 1, wherein the V-groove is formed by polishing or etching the cladding, and a V-groove is formed each in an upper portion and in a lower portion around the core.

4. The optical signal out-coupling optical fiber of claim 1, wherein when a tilted Bragg grating is formed in the core, the V-groove is formed in a direction in which optical signals are incident on the region of the tilted Bragg grating, and
   when a long period optical fiber grating is formed, the V-groove is formed in a direction in which optical signals are emitted in the region of the long period optical fiber grating.

5. The optical signal out-coupling optical fiber of claim 4, wherein at least two V-grooves are formed, and
   an epoxy is formed in at least one of the V-grooves, and optical signals are refracted at the V-groove in which the epoxy is formed and emitted to the outside.

6. The optical signal out-coupling optical fiber of claim 5, wherein the epoxy is formed so as to function as a lens.

7. The optical signal out-coupling optical fiber of claim 5, wherein two V-grooves are formed, and a cross-section of the V-grooves in a direction of the grating is inclined at a predetermined angle with respect to the propagation direction of the cladding mode, and
   an epoxy is formed in the V-groove that is near to the grating of the two V-grooves such that optical signals are refracted at the V-groove, in which the epoxy is formed, and are totally reflected at the V-groove, in which the epoxy is not formed, thus to be focused in the same direction.

8. The optical signal out-coupling optical fiber of claim 1, wherein the V-groove is formed to 55 μm or less in a depth direction of the optical fiber, to 125 μm or less in a width direction of the optical fiber, and to 110 μm or less in a length direction of the optical fiber.

9. The optical signal out-coupling optical fiber of claim 1, wherein the optical fiber is used in an optical signal detecting apparatus that monitors or detects optical signals.

10. An optical signal detecting apparatus comprising:
    the optical signal out-coupling optical fiber of claim 1; and
    an optical signal receiving device monitoring which detects optical signals emitted from the optical fiber.

11. The optical signal detecting apparatus of claim 10, wherein the tilted Bragg grating or the long period optical fiber grating couples a forward-propagating core mode to a backward-propagating cladding mode or a forward-propagating cladding mode, respectively, and
    optical signals of the backward- or forward-propagating cladding mode are reflected at the V-groove so as to be incident on the optical signal receiving device.

12. The optical signal detecting apparatus of claim 10, wherein when a tilted Bragg grating is formed in the core, the V-groove is formed in a direction in which optical signals are incident on the region of the tilted Bragg grating, and
    when a long period optical fiber grating is formed, the V-groove is formed in a direction in which optical signals are emitted in the region of the long period optical fiber grating.

13. The optical signal out-coupling optical fiber of claim 12, wherein at least two V-grooves are formed, and
    an epoxy is formed in at least one of the V-grooves, and optical signals are refracted at the V-groove in which the epoxy is formed and emitted to the outside.

14. The optical signal out-coupling optical fiber of claim 13, wherein the epoxy is formed so as to function as a lens focusing the emitted optical signals to the optical signal receiving device.

15. The optical signal out-coupling optical fiber of claim 13, wherein two V-grooves are formed, and a cross-section of the V-grooves in a direction of the grating is inclined at a predetermined angle with respect to the propagation direction of the cladding mode, and an epoxy is formed in the V-groove that is near to the grating of the two V-grooves so that optical signals are refracted at the V-groove, in which the epoxy is formed, and are totally reflected at the V-groove, in which the epoxy is not formed, in order to be focused in the same direction.

16. The optical signal out-coupling optical fiber of claim 10, wherein the V-groove is formed to 55 μm or less in a depth direction of the optical fiber, to 125 μm or less in a width direction of the optical fiber, and to 110 μm or less in a length direction of the optical fiber.

\* \* \* \* \*